United States Patent [19]

Shirokov et al.

[11] 4,185,977
[45] Jan. 29, 1980

[54] METHOD OF AND APPARATUS FOR PRODUCING HYDROGEN

[76] Inventors: Vasily I. Shirokov, ulitsa S. Kovalevskoi, 10/3, kv. 105, Leningrad; Gennady G. Maljutin, ulitsa Kirova, 4, kv. 2, Novopolotsk; Iliasaf I. Mishiev, kvartal 19th, 11, kv. 1, Sumgait; Jury V. Saveliev, ulitsa Pionerskaya, 18, kv. 10, Baku, all of U.S.S.R.

[21] Appl. No.: 917,171

[22] Filed: Jun. 20, 1978

[30] Foreign Application Priority Data

Jun. 23, 1977 [SU] U.S.S.R. ................ 2499472

[51] Int. Cl.² ........................................... F25J 3/06
[52] U.S. Cl. ........................................... 62/23; 62/27; 62/5; 62/42

[58] Field of Search ............... 62/23, 24, 27, 28, 5

[56] References Cited

U.S. PATENT DOCUMENTS

| | | | |
|---|---|---|---|
| 3,062,015 | 11/1962 | Cost | 62/23 |
| 3,443,388 | 5/1969 | Kramer et al. | 62/23 |
| 3,626,705 | 12/1971 | Knapp et al. | 62/23 |
| 3,775,988 | 12/1973 | Fekete | 62/23 |

Primary Examiner—Norman Yudkoff
Attorney, Agent, or Firm—Steinberg & Blake

[57] ABSTRACT

The present invention relates to methods of separating hydrocarbon and gaseous mixtures and, more particularly, to methods of producing hydrogen from hydrocarbon gaseous mixtures and apparatus for implementing such methods.

2 Claims, 1 Drawing Figure

U.S. Patent
Jan. 29, 1980
4,185,977
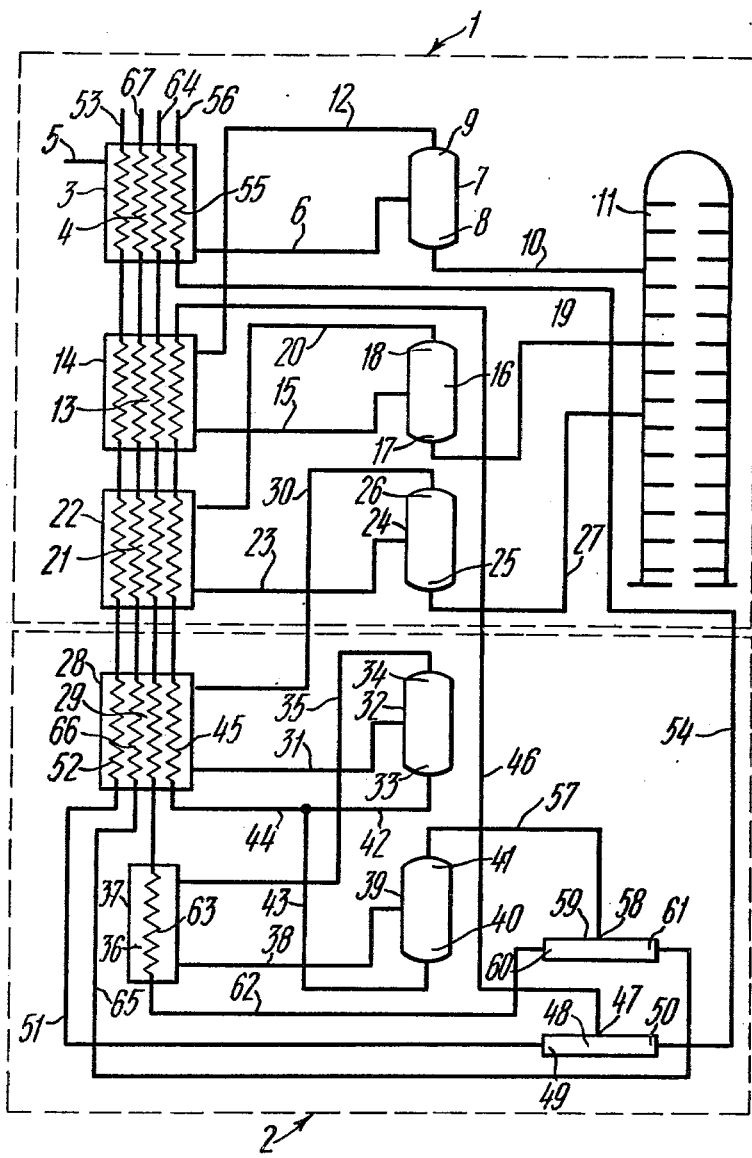

METHOD OF AND APPARATUS FOR PRODUCING HYDROGEN

The present method of producing hydrogen from a gaseous mixture including essentially hydrogen, methane and olefins resides in cooling said gaseous mixture in heat exchangers by stages, the resulting liquid condensates being separated from said mixture at each cooling stage. The products thus obtained are a liquid condensate of olefins, a liquid condensate of methane with an admixture of hydrogen, and 85 to 97 mol.% pure hydrogen. Therewith, gaseous methane with an admixture of hydrogen, obtained by evaporation from the liquid condensate, is subjected to expansion with the use of vortex effect, the result being a cold and hot streams of gaseous methane with an admixture of hydrogen, whereupon these streams are fed separately to heat exchangers, each having an appropriate temperature, countercurrently to the gaseous mixture being separated. The 85 to 97 mol.% pure hydrogen is also subjected to expansion with the use of vortex effect, the result being a cold stream consisting of pure hydrogen and a hot stream consisting of methane with an admixture of hydrogen, whereupon said streams are fed separately to heat exchangers, each having an appropriate temperature.

An apparatus for realizing the method of the invention comprises a unit for separating olefins from the initial gaseous mixture, said unit consisting of a plurality of tubular heat exchangers and a plurality of separators, and a unit for separating the remaining gaseous mixture into hydrogen with an admixture of methane and methane with an admixture of hydrogen, said second-mentioned unit consisting of tubular exchangers and separators similar to those employed in said first-mentioned unit, and a first vortex pipe adapted for separating methane with an admixture of hydrogen into a cold and hot flows of methane, said pipe having a nozzle inlet, a cold end and a hot end; a second vortex pipe, similar in construction to said first vortex pipe and adapted for separating hydrogen with an admixture of methane into a cold stream consisting of pure hydrogen and a hot stream consisting of methane with an admixture of hydrogen. Liquid-containing sections of said separators of said unit for separating the remaining gaseous mixture into hydrogen with an admixture of methane and methane with an admixture of hydrogen are associated through one of the tubes of the heat exchangers having an appropriate temperature with the nozzle inlet of the first vortex pipe, the cold end and the hot end thereof being separately associated with other tubes of the heat exchangers having an appropriate temperature.

The present invention ensures full utilization of the energy potentialities of the gaseous mixture being separated, which is under a pressure, for producing cold. The temperatures thus attained allow the production of hydrogen having a purity of up to 99.9 mol.%. No additional power sources are required.

FIELD OF THE INVENTION

The present invention relates in general to methods for the separation of gaseous hydrocarbon mixtures, and more particularly, to methods of and apparatus for producing hydrogen from gaseous hydrocarbon mixtures.

The invention can most advantageously be used in the production of hydrogen available from gaseous mixtures of hydrocarbons including essentially hydrogen, methane and olefins (ethylene, ethane and a $C_3$ fraction).

BACKGROUND OF THE INVENTION

Hydrogen is finding a wide range of applications in present-day petroleum refining processes. The processes involving nonsaturated hydrocarbons hydrogenation in the manufacture of high-grade gasoline, aromatic hydrocarbons, olefine hydrogenation from acetylenic hydrocarbons and petroleum fractions hydrocracking are reputed to be a major consumer of hydrogen. Furthermore, high-purity hydrogen is being extensively utilized now as fuel for rocket engines.

While conducting such petroleum refining processes, and especially those concerned with the pyrolysis of diverse hydrocarbon materials, along with such components as ethylene, propylene, butane-butylenes, aromatic hydrocarbons, a fairly substantial amount of hydrogen is also being formed. The amount of hydrogen runs up to 1.5% by weight of the bulk of the material processed and therefore its recovery is assuming an ever increasing scale. The output of hydrogen recovery facilities operated in today's ethylene plants reaches 4,000+40,000 tons of hydrogen per year.

In the prior state of the art there are known a multiplicity of various methods of and apparatus for producing hydrogen from gaseous mixtures of hydrocarbons.

In particular, there is known a method of producing hydrogen from a gaseous mixture including primarily hydrogen, methane and olefins (cf. U.S. Pat. No. 3,443,388), according to which the gaseous mixture is cooled in a plurality of stages of successively lower temperatures to effect condensation of the olefins and a major portion of the methane from said mixture. Hydrogen is withdrawn from the last stage of cooling, and the condensate from the last two stages of cooling is introduced into a demethanizer. An amount of refrigeration required for cooling the hydrogen-rich gas is supplied by evaporation of the methane-rich condensate when throttling it and evaporizing countercurrently in indirect heat exchange contact against the gas being cooled.

The aforesaid method is incorporated in an apparatus comprising coolers, separators and a demethanizer. The demethanizer is communicated with liquid-containing sections of the separators provided for the separation of the gas-liquid streams rich in olefins. A gas-containing section of the separator provided for the separation of a methane-hydrogen fraction from the olefins is in communication via a heat exchanger wherein the liquid methane fraction throttled to a low pressure is used as a cooling agent, with the separator wherein the separation of the liquid methane and the gaseous hydrogen fractions is accomplished. The resulting hydrogen of 80–85 mole percent purities is withdrawn from the gas-containing section of this separator, and the liquid methane is withdrawn from its liquid-containing section and fed into the demethanizer via a pipeline.

The most serious disadvantage of the abovedescribed method and apparatus for the production of hydrogen consists in that the resulting hydrogen has a purity degree of not more than 80–85 mole percent which is attributable to the insufficiently low temperature level obtained at the last stage of the cooling of the gaseous mixture under separation. The throttling of the liquid methane as employed in this method affords temperatures of about $-137°$ C., at which level the production of hydrogen of higher purity degrees is impracticable.

Moreover, this prior art method and apparatus fail to take full advantage of the energetic potentialities of the compressed gaseous mixture under separation in order to gain additional amounts of refrigeration.

Also known is a method of producing hydrogen from a gaseous mixture including essentially hydrogen, methane and olefins (see U.S. journal "Petroleum Engineer", 1972, No. 3, pp. 117–122), which partly eliminates the disadvantages intrinsic to the method described previously. According to this prior art method the gaseous mixture is cooled in a plurality of stages of sequentially lower temperatures, with the most of the olefins being initially removed from the gaseous mixture by condensation and directed for demethanization, the remaining portion of the gaseous mixture comprised of hydrogen and methane being subjected to further cooling in stages for the purpose of effecting maximum methane condensation, and a balance of refrigeration needed for said cooling of the gaseous mixture comprised of hydrogen and methane being provided by expanding nitrogen in an expansion turbine. Nitrogen utilized as a cooling agent is compressed in a nitrogen compressor prior to its introduction into said expansion turbine.

This prior art method is implemented in an apparatus comprising coolers, separators, a demethanizer, a nitrogen compressor and an expansion turbine. The liquid-containing sections of the separators provided for the separation of the olefins-rich mixtures are communicated with the demethanizer via pipelines, and the gas-containing sections of said separators are adapted to be in communication with the heat exchangers wherein the nitrogen being expanded in the expansion turbine is employed as a cooling agent. The separation of the liquid methane fraction and the gaseous hydrogen fraction formed at the last cooling stage is effected means of the separator from the gas-containing section of which the resulting hydrogen of 95—97 mole percent purities is withdrawn via a pipeline, while the liquid methane is withdrawn from the liquid-containing section thereof and then directed via a pipeline for evaporation countercurrently against the gaseous mixture being separated.

Although the abovestated method of and apparatus for producing hydrogen afford the production of hydrogen of higher purities than those obtainable with the method and apparatus considered hereinafore, however, this hydrogen purity improvement is achieved at the expense of making the method and apparatus design more complex, apart from appreciably increasing power consumption. This is incidental to the use of nitrogen as a source of refrigeration which is to be compressed in a nitrogen compressor and then expanded in an expansion turbine.

In addition, this prior art method and apparatus do not employ to the full the energetic possibilities present in the gaseous mixture under separation in terms of securing supplementary refrigeration.

In the present-day state of the art of petroleum refining industry there is generally known a method concerned with the production of hydrogen from a gaseous mixture including hydrogen, methane and olefins, which method partially surmounts the disadvantages of the abovedescribed methods. According to this method, the gaseous mixture is cooled by stages in heat exchangers by the products of its separation to such temperature levels as to provide removal of the olefins and a portion of the methane from the gaseous mixture. The condensate formed at each of these cooling stages is separated from the remaining gaseous mixture and passed for demethanization. The remainder of the gaseous mixture comprised of hydrogen and methane obtained after removal of the olefins is passed for further cooling by stages for the purpose of condensing hydrogen-admixed methane from the gaseous mixture. The resulting liquid hydrogen-admixed methane is separated, subjected to throttling and then delivered for evaporation in the heat exchangers of corresponding temperatures in a countercurrent manner in relation to the gaseous mixture being separated. Hydrogen is recovered at the last cooling stage. In order to provide low temperature levels at this stage of cooling the liquid hydrogen-admixed methane is caused to be evaporized at a pressure of from 0.04 mn/m² to 0.65 mn/m² through the use of a methane compressor including a vacuum stage.

The abovementioned method is incorporated in an apparatus which comprises tubular heat exchangers, separators, a demethanizer and a methane vacuum stage-containing compressor. A number of the tubular heat exchangers and separators combines into a unit providing removal of the olefins from the gaseous mixture under separation, while the rest of the heat exchangers and separators combines into a unit providing the separation of the remainder of the gaseous mixture into methane-admixed hydrogen and hydrogen-admixed methane. The tubes of the heat exchangers are designed for the conveyance of the products of the separation of the remainder of the gaseous mixture into methane-admixed hydrogen and hydrogen-admixed methane. The intertubular spaces of all the heat exchangers are designed for the conveyance of the gaseous mixture under separation and are interconnected between themselves through the gas-containing sections of the separators. The liquid-containing sections of the separators included in the unit providing the separation of olefins are in communication with the demethanizer. The liquid-containing sections of the separators included in the unit providing the separation of the remainder of the gaseous mixture into methane-admixed hydrogen and hydrogen-admixed methane are adapted to be in communication with the vacuum stage of the methane compressor via one of the tubes of the tubular heat exchangers designed for evaporization of the liquid hydrogen-admixed methane at a pressure of from 0.04 mn/m² to 0.65 mn/m². The resulting 97 mole percent purity hydrogen is derived via a pipeline from the gas-containing section of the last separator included in the unit providing the separation of the remainder of the gaseous mixture into methane-admixed hydrogen and hydrogen-admixed methane.

With this pripr art method and apparatus affords the production of the 97 mol percent purity hydrogen with 15–20% reduction of power consumption as compared with the method employing a nitrogen compressor and an expansion turbine as described hereinabove, the level of power consumption remains still fairly high.

Furthermore, this method and apparatus impliment-ing this method fail to make full use of the energetic potentialities of the gaseous mixture being separated under pressure.

Besides, the apparatus comprising a compressor with a vacuum stage is exposed to the risk of break-down whenever the ambient air is leaking in the vacuum stage of the compressor.

It should be also noted that aforementioned methods and apparatus allow to obtain 85–97 mole percent purity hydrogen which do not sufficiently meet the requirements of many manufacturing processes utilizing hydrogen.

In addition these prior art methods and apparatus have a relatively sophisticated process flow diagram.

SUMMARY OF THE INVENTION

It is an object of the present invention to eliminate the abovestated disadvantages.

Another object of the present invention is to provide a method of and apparatus for producing hydrogen of improved purity degrees.

Yet another object of the present invention is to reduce the power consumption involved in the production of hydrogen.

Still another object of the present invention is to take full advantage of the energetic potentialities available in the pressurized gaseous mixture under separation.

Still further object of the present invention is to simplify the process flow diagram employed in the production of hydrogen, and consequently, to step up the operation reliability of the apparatus.

With these and other objects in view, there is proposed a method of producing hydrogen from a gaseous mixture including essentially hydrogen, methane and olefins, comprising the following steps: cooling said gaseous mixture in heat exchangers by stages to temperature levels sufficient for ensuring removal of the olefins and a portion of the methane therefrom in the form of condensate, with same being separated from this mixture at each cooling stage, further cooling the remaining gaseous mixture in the heat exchangers by stages to temperature levels sufficient for providing the production of hydrogen of 85–97 mole percent purities, with the resulting liquid hydrogen-admixed methane condensate being separated at each cooling stage, evaporizing same in the heat exchangers of matching temperature levels countercurrently against the gaseous mixture under separation, producing thereby gaseous hydrogen-admixed methane, wherein, according to the invention, the gaseous hydrogen-admixed methane produced by evaporation from the condensate is subjected to expanding with the use of vortex effect, as a result of which a cold stream and a hot stream of gaseous hydrogen-admixed methane are produced, whereafter said streams are separately fed into the head exchangers of matching temperature levels countercurrently against the gaseous mixture under separation, and the hydrogen of 85–97 mole percent purities is similarly subjected to expanding with the use of vortex effect, as a result of which a cold stream of substantially pure hydrogen and a hot stream of hydrogen-admixed methane are being produced, whereafter said streams are separately fed into the heat exchangers of matching temperature levels countercurrently against the gaseous mixture under separation.

With these and other objects in view, there is also proposed an apparatus implementing the method of producing hydrogen from a gaseous mixture including essentially hydrogen, methane and olefins, comprising a unit for removal of olefins from the starting gaseous mixture and a unit for the separation of the remaining gaseous mixture into methane-admixed hydrogen and hydrogen-admixed methane, each of which comprises tubular heat exchangers providing cooling the gaseous mixture under separation by stages, wherein the tubes are designed for the passage of the products produced by the separation of the remaining gaseous mixture, and the intertubular space thereof is designed for the passage of the gaseous mixture under separation, separators having a gas-containing section and a liquid-containing section and designed for the separation of the resulting gas-liquid mixture into a gaseous stream and a liquid stream at each cooling stage, with the intertubular spaces of all the heat exchangers being interconnected between themselves via the gas-containing sections of the separators, and the liquid-containing sections of the separators of the unit for the separation of the remaining gaseous mixture into methane-admixed hydrogen and hydrogen-admixed methane being in communication with the end of one of the tubes of the heat exchangers of matching temperature levels, wherein the liquid hydrogen-admixed methane is being evaporized to a gaseous phase, in which, according to the invention, the unit for the separation of the remaining gaseous mixture into methane-admixed hydrogen and hydrogen-admixed methane comprises a vortex tube adapted for separating the hydrogen-admixed methane into a cold stream and a hot stream and having its nozzle inlet connected to the other end of said tube, wherein the liquid hydrogen-admixed methane is being evaporized, and its cold end and hot end being connected respectively to the tubes of the heat exchangers of matching temperature levels, a second vortex tube adapted for separating the methane-admixed hydrogen into a cold stream of substantially pure hydrogen and a hot stream of hydrogen-admixed methane and having its nozzle inlet being in communication with the gas-containing section of the separator of the unit for the separation of the remaining gaseous mixture into methane-admixed hydrogen and hydrogen-admixed methane, and its cold end and hot end being connected respectively to the other tubes of the heat exchangers of matching temperature levels.

The proposed apparatus permits to take full advantage of the energetic potentialities available in the pressurized gaseous mixture under separation in terms of securing refrigeration. The temperature levels attained thereby range from $-185°$ C. to $-195°$ C., and afford the production of the 99.9 mole percent purity hydrogen, while the employment of any other supplementary energy sources to provide refrigeration is dispensable.

The abovementioned and other objects, as well as features of novelty and operational advantages of the proposed invention will become more readily apparent on consideration of the detailed description of an example of the embodiment of the subject of the invention with reference being made to the accompanying drawing, in which there is illustrated a basic process flow diagram.

DETAILED DESCRIPTION OF THE INVENTION

The proposed method of producing hydrogen from a gaseous mixture including essentially hydrogen, methane and olefins resides in cooling said mixture in a number of stages of sequentially lower temperatures to effect condensation of a major portion of the gas comprised of the higher boiling components, with the temperature of the last cooling stage being selected so that the gas withdrawn therefrom has the lowest boiling point.

At the initial cooling stages the gaseous mixture under separation is cooled in heat exchangers to such temperatures as to ensure removal of the olefins and a portion of the methane therefrom in the form of condensate. The resulting condensate formed at each cooling stage is separated from the remainder of the gaseous mixture and is passed for demethanization. The remainder of the gaseous mixture including hydrogen and methane, produced after removal of the olefins, is passed for further cooling in tubular heat exchangers other than those identified above. Said gaseous mixture is cooled to such temperatures as to provide the obtainment of the 85—97 mole percent purity hydrogen. The resulting liquid hydrogen-admixed methane condensate formed at each cooling stage is separated from the remainder of the gaseous mixture and passed for evaporization in the heat exchangers of matching temperature levels in a countercurrent manner in relation to the gaseous mixture under separation. The resulting stream of gaseous hydrogen-admixed methane produced by evaporization of the liquid hydrogen-admixed methane is subjected to expanding with the use of the vortex effect, as a result of which a cold stream and a hot stream of gaseous methane are being produced, upon which said streams are separately fed into the heat exchangers of matching temperature levels in a countercurrent manner in relation to the gaseous mixture under separation. The 85-97 mole percent purity hydrogen is also subjected to expanding with the use of the vortex effect, as a result of which a cold stream of the 99.9 mole percent purity hydrogen and a hot stream of hydrogen-admixed methane are being produced, upon which said streams are separately fed into the heat exchangers of matching temperature levels in a countercurrent manner in relation to the gaseous mixture under separation.

The apparatus for implementing the proposed method of producing hydrogen from a gaseous mixture including essentially hydrogen, methane and olefins, comprises a unit 1 for removal of the olefins from the starting gaseous mixture and a unit 2 for the separation of the remaining gaseous mixture into methane-admixed hydrogen and hydrogen-admixed methane. The unit 1 for removal of the olefins from the starting gaseous mixture comprises a tubular heat exchanger 3, the intertubular space 4 of which is communicated via a pipeline 5 with a source of the starting gaseous mixture (not shown in the drawing) and via a pipeline 6, with a separator 7. The separator 7 has a liquid-containing section 8 and a gas-containing section 9. The liquid-containing section 8 of the separator 7 is in communication via a pipeline 10 with a demethanizer 11. The gas-containing section 9 of the separator 7 is in communication via a pipeline 12 with an intertubular space 13 of a tubular heat exchanger 14. The intertubular space 13 of the tubular heat exchanger 14 is connected via a pipeline 15 to a separator 16, having a liquid-containing section 17 and a gas-containing section 18. The liquid-containing section 17 of the separator 16 is in communication via a pipeline 19 with the demethanizer 11, and its gas-containing section 18 is in communication via a pipeline 20 with the intertubular space 21 of a tubular heat exchanger 22. The intertubular space 21 of the tubular heat exchanger 22 is connected via a pipeline 23 to a separator 24 having a liquid-containing section 25 and a gas-containing section 26. The liquid-containing sectin 25 of the separator 24 is adapted to be communicated via a pipeline 27 with the demethanizer 11.

The unit 2 for the separation of the remaining gaseous mixture into methane-admixed hydrogen and hydrogen-admixed methane comprises a tubular heat exchanger 28, the intertubular space 29 of which is connected via a pipeline 30 to the gas-containing section 26 of the separator 24, and via a pipeline 31, to a separator 32 having a liquid-containing section 33 and a gas-containing section 34. The gas-containing section 34 of the separator 32 is connected via a pipeline 35 to the intertubular space 36 of a tubular heat exchanger 37, which space is in communication via a pipeline 38 with a separator 39. The separator 39 has a liquid containing section 40 and a gas-containing section 41. The liquid-containing section 33 of the separator 32 via a pipeline 42, and the liquid-containing section 40 of the separator 39 via a pipeline 43 are connected to a common pipeline 44, which, in turn, is communicated with one end of a tube 45 of the tubular heat exchangers 28, 22 and 14. The other end of the tube 45 is connected via a pipeline 46 to a nozzle inlet 47 of a vortex tube 48 having a cold end 49 and a hot end 50. The cold end 49 of the vortex tube 48 is connected via a pipeline 51 to the tube 52 of the tubular heat exchangers 28, 22, 14 and 3. The tube 52 of these heat exchangers is in communication with a pipeline 53 adapted to discharge the separation product of the gaseous mixture, passing through the tube 52. The hot end 50 of the vortex tube 48 is connected via a pipeline 54 to a tube 55 of the tubular heat exchanger 3, which, in turn, is open to a pipeline 56 adapted to discharge the separation product of the gaseous mixture, passing through the pipeline 55. The gas-containing section 41 of the separator 39 is communicated via a pipeline 57 with a nozzle inlet 58 of a vortex tube 59 having a cold end 60 and a hot end 61. The cold end 60 of the vortex tube 59 is connected via a pipeline 62 to a tube 63 of the tubular heat exchangers 37, 28, 22, 14 and 3, which, in its turn, is open to a pipeline 64 provided for the withdrawal of the separation product of the gaseous mixture, passing through the tube 63 from the apparatus. The hot end 61 of the vortex tube 59 is connected via a pipeline 65 to a tube 66 of the tubular heat exchangers 28, 22, 14 and 3, which, in its turn, is open to a pipeline 67 provided for the withdrawal of the separation product of the gaseous mixture, passing through the tube 66 from the apparatus. The intertubular spaces 4, 13, 21, 29 and 36 of the tubular heat exchangers 3, 14, 22, 28 and 37 are interconnected through the gas-containing sections 9, 18, 26 and 34 of the separators 7, 16, 24 and 32 via the pipelines 6, 12, 15, 20, 23, 30, 31 and 35.

A typical process flow diagram for the production of hydrogen in accordance with the present invention will be now contemplated.

The starting gaseous mixture including hydrogen, methane and olefins (ethylene, ethane and a $C_3$ fraction) at a pressure of 32–38 mn/m$^2$ and a temperature of $-92°$ to $-97°$ C. is passed through the pipeline 5 into the intertubular space 4 of the tubular heat exchanger 3 of the unit 1 for removal of the olefins from the starting gaseous mixture. This gaseous mixture is cooled in the heat exchanger 3 by the products of its separation to a temperature of $-98°$ to $-102°$ C., as a result of which partial condensation of the methane, ethylene and ethane and complete condensation of the $C_3$ fraction are effected. The resulting gas-liquid mixture is passed via the pipeline 6 into the separator 7, wherein said mixture is separated into a condensate and a remainder of the gaseous mixture. The condensate is passed from the liquid-containing section 8 of the separator 7 via the pipeline 10 into the demethanizer 11, while the remainder of the gaseous mixture is passed from the gas-containing section 9 of this separator via the pipeline 12 for further cooling into the intertubular space 13 of the tubular heat exchanger 14 cooled by the products of the separation of the gaseous mixture. The gaseous mixture is cooled in the heat exchanger 14 to a temperature −115° to −125° C., as a result of which partial condensation of the methane complete condensation of the ethane and condensation of a major portion of the ethylene are effected. The resulting gas-liquid mixture is passed via the pipeline 15 into the separator 16, wherein said mixture is separated into liquid condensate and a remainder of the gaseous mixture. The liquid condensate is passed from the liquid-containing section 17 of the separator 16 into the demethanizer 11 via the pipeline 19, while the remainder of the gaseous mixture is passed from the gas-containing section 18 of said separator via the pipeline 20 for further cooling into the intertubular space 21 of the tubular heat exchanger 22 cooled by the products of the separation of the gaseous mixture. The gaseous mixture is cooled in the tubular heat exchanger 22 to a temperature of −125° to −135° C., as a result of which partial condensation of the methane and complete condensation of the ethylene are effected. The resulting gas-liquid mixture is passed via the pipeline 23 into the separator 24, wherein said mixture is separated into liquid condensate and a remainder of the gaseous mixture comprised of hydrogen and methane. The liquid condensate is passed from the liquid-containing section 25 of the separator 24 into the demethanizer 11 via the pipeline 27. The remainder of the gaseous mixture is passed from the gas-containing section 26 of the separator 24 via the pipline 30 into the intertubular space 29 of the tubular heat exchanger 28 of the unit 2 provided for the separation of the remaining gaseous mixture into methane-admixed hydrogen and hydrogen-admixed methane. Said gaseous mixture is cooled in the tubular heat exchanger 28 by the products of its separation to the temperature −140° to −145° C., as a result of which a gas-liquid mixture is formed, whereafter this mixture is passed into the separator 32 via the pipeline 31. Said gas-liquid mixture is separated in the separator 32 into liquid hydrogen-admixed methane condensate and a gaseous mixture comprised of hydrogen and methane. The gaseous mixture is passed from the gas-containing section 34 of the separator 32 via the pipeline 35 into the intertubular space 36 of the tubular heat exchanger 37 cooled by a cold stream of substantially pure hydrogen. The gaseous mixture is cooled in the tubular heat exchanger 37 to a temperature −155° to −165° C., as a result of which condensation of a major portion of the methane and a small amount of the hydrogen is effected. The resulting gas-liquid mixture is passed via the pipeline 38 into the separator 39, wherein said mixture is separated into liquid hydrogen-admixed methane condensate and the 85–97 mole percent purity hydrogen. The liquid condensates are passed from the liquid-containing sections 33 and 40 of the separators 32 and 39 via the pipelines 42 and 43 respectively, and then via the common pipeline 44 to the tube 45 of the heat exchangers 28, 22 and 14. While the liquid hydrogen-admixed methane condensate is moving via the tube 45 through the heat exchangers 28, 22 and 14 in a countercurrent manner in relation to the gaseous mixture under separation, its evaporation is being effected. The resulting gaseous hydrogen-admixed methane is passed via the pipeline 46 into the vortex tube 48 through its nozzle inlet 47. As a result of expanding in the vortex tube from a pressure of 32 to 37 mn/m$^2$ to a pressure 2.5 to 3.5 mn/m$^2$ a stream of hydrogen-admixed methane is divided into two streams, a cold stream comprised of hydrogen-admixed methane, having a temperature of −140° to −150° C., and a hot stream comprised of hydrogen-admixed methane, having a teperature of −105° to −115° C. The cold stream of hydrogen-admixed methane flows from the vortex tube 48 through its cold end 49 and is passed via the pipeline 51 into the tube 52 of the heat exchangers 28, 22, 14 and 3. While moving through said heat exchangers via the tube 52 is a countercurrent manner in relation to the gaseous mixture under separation, the gaseous hydrogen-admixed methane is heated to a temperature of −100° to −110° C. and withdrawn from the apparatus via the pipeline 53. The hot stream of hydrogen-admixed methane flows from the vortex tube 48 through its hot end 50 and is passed via the pipeline 54 into the tube 55 of the heat exchanger 3. While moving through said heat exchanger via the tube 55 in a countercurrent manner in relation to the gaseous mixture under separation, the gaseous hydrogen-admixed methane is heated to a temperature of −100° to −110° C. and withdrawn from the apparatus via the pipeline 56. The 85–97 mole percent purity hydrogen is passed from the gas-containing section 41 of the separator 39 into the vortex tube 59 through its nozzle inlet 58. As a result of expanding in the vortex tube 59 from a pressure of 32–37 mn/m$^2$ to a pressure of 2.5–3.5 mn/m$^2$, a stream of the 85–97 mole percent purity hydrogen is divided into two streams, a cold stream of the 99.9 mole percent purity hydrogen, having a temperature of −185° to −195° C., a hot stream of hydrogen flows from the vortex tube 59 through its cold end 60, and is passed via the pipeline 62 into the tube 63 of the heat exchangers 37, 28, 22, 14 and 3. While moving through these heat exchangers via the tube 63 in a countercurrent manner in relation to the gaseous mixture under separation said hydrogen is heated to a temperature −100° to −110° C. and withdrawn from the apparatus via the pipeline 64. The hot stream of hydrogen-admixed methane flows from the vortex tube 59 through its hot end 61, and is passed via the pipeline 65 into the tube 66 of the heat exchangers 28, 22, 14 and 3. While moving through these heat exchangers via the tube 66 in a countercurrent manner in relation to the gaseous mixture under separation, the gaseous method is heated to a temperature of −100° to −110° C. and withdrawn from the apparatus via the pipeline 67.

In order to make the invention more clearly understood, an example of the specific embodiment thereof in accordance with the abovedescribed process flow diagram will now be presented.

EXAMPLE

To produce the starting gaseous mixture, gasoline having the limits of boiling of 62°–180° C. is subjected to pyrolysis at a temperature of 820° to 850° C. with an addition of vapor constituting 50 percent by weight of the gasoline bulk. The resulting pyrogas is cooled to a temperature 20° to 30° C. and compressed from a pressure of 1.2–1.3 mn/m$^2$ to a pressure of 30–40 mn/m$^2$, with acid gases being removed from the gaseous mixture. Heavy C$_4$ and higher hydrogens are removed from the compressed gaseous mixture, and the remaining gaseous mixture is hydrogenated from acytelenic compounds, and then dehumidified and subjected to further cooling in stages to a temperature of −93° to −97° C. The resulting condensates formed at each cooling stage comprised of a mixture of C$_3$, C$_2$ and C$_1$ fractions are directed into the demethanizer and the remaining gaseous mixture is passed for removal of hydrocarbon monoxide. The resulting gaseous mixture comprised of hydrogen, methane and olefins produced by the described method is treated in accordance with the process flow diagram as specified hereinabove.

A material balance of the streams conveyed through the respective pipelines of the mentioned process flow diagram is given in the appended table.

The table given below is illustrative of predetermined specific operating conditions for an embodiment of the method of the present invention, but it is to be clearly understood that the scope of the present invention is not to be limited thereby.

From the given embodiment of the present invention it becomes readily apparent for those skilled in the art that all the objects of the invention within the scope specified by the appended claims are achievable. However, it is also readily apparent that some modifications and variations in the performance of the operations of the method are well as in the structure of the apparatus for the incorporation thereof are possible without substantially departing from the spirit of the invention.

All such modifications and variations are considered to be well within the spirit and scope of the invention specified by the appended claims.

The proposed method and apparatus for the production of hydrogen from hydrogen gases are highly efficient. According to the method of the present invention the production of the 99.9 mole percent purity hydrogen does not require any additional refrigeration sources. The temperatures within from $-185°$ C. to $-195°$ C. which secure the production of hydrogen of such a high purity degree are attained exclusively through taking full advantage of the energetic potentialities of the starting gaseous mixture under pressure. This leads to the reduction of the power consumption involved in the production of hydrogen, and a consequent 10% and higher reduction of the total power consumption.

The apparatus implementing this method is quite simple in design and operation because of the complete absence of the structural elements with moving parts. The apparatus is readily automotized.

Table

| Pipelines Components | 5 mole % | 10 mole % | 12 mole % | 19 mole % | 20 mole % | 27 mole % | 30 mole % | 42 mole % | 35 mole % | 43 mole % | 44 mole % | 57 mole % | 62 mole % | 65 mole % | 51 mole % | 54 mole % |
|---|---|---|---|---|---|---|---|---|---|---|---|---|---|---|---|---|
| $H_2$ | 57.65 | — | 59.18 | 0.38 | 65.39 | 3.66 | 79.34 | 4.5 | 82.35 | 3.85 | 3.54 | 92.97 | 99.9 | 5.43 | 4.35 | 0.05 |
| $CH_4$ | 38.18 | 83.52 | 36.91 | 86.58 | 34.12 | 90.43 | 26.54 | 94.45 | 17.65 | 96.15 | 96.11 | 7.03 | 0.1 | 94.57 | 95.65 | 99.70 |
| $C_2H_4$ | 3.84 | 14.65 | 3.55 | 11.98 | 0.49 | 5.91 | 0.12 | 1.05 | — | — | 0.35 | — | — | — | — | 0.25 |
| $C_2H_6$ | 0.38 | 1.43 | 0.36 | 1.06 | — | — | — | — | — | — | — | — | — | — | — | — |
| $C_3$ | 0.01 | 0.40 | — | — | — | — | — | — | — | — | — | — | — | — | — | — |
|  | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| T °C. | −95 | −100 | −100 | −125 | −125 | −135 | −135 | −140 | −140 | −160 | −145 | −160 | −185 | −145 | −150 | −105 |
| $Pmn/m^2$ | 37.3 | 37.3 | 37.0 | 36.9 | 36.9 | 36.7 | 36.7 | 36.5 | 36.5 | 36.5 | 36.5 | 36.5 | 3.5 | 3.5 | 2.5 | 2.5 |

What we claim is:

1. A method of producing hydrogen from a gaseous mixture including essentially hydrogen, methane and olefins comprising the following steps:

cooling said gaseous mixture in heat exchangers by stages to temperature levels sufficient to ensure removal of the olefins and a portion of the methane from the gaseous mixture in the form of liquid condensate, with said liquid condensate being separated from the gaseous mixture at each cooling stage, feeding the remaining gaseous mixture comprised of hydrogen and methane into heat exchangers for further cooling by stages to temperature levels sufficient to provide the obtainment of the hydrogen of 85–97 mole percent purities, with the resulting liquid hydrogen-admixed methane condensate being separated at each cooling stage, feeding said liquid condensate comprised of liquid hydrogen-admixed methane for the purpose of evaporization into said heat exchangers of matching temperature levels countercurrently against the gaseous mixture under separation, as a result of which the liquid condensate is being converted to gaseous hydrogen-admixed methane, expanding the resulting gaseous hydrogen-admixed methane with the use of vortex effect, as a result of which a cold stream and a hot stream of gaseous hydrogen-admixed methane are being produced, separately feeding said cold and hot streams of gaseous hydrogen-admixed methane into said heat exchangers of matching temperature levels countercurrently against the gaseous mixture under separation, expanding the hydrogen 85–97 mole percent purities with the use of vortex effect, as a result of which a cold stream of substantially pure hydrogen and a hot stream of hydrogen-admixed methane are being produced, separately feeding said cold and hot streams into said heat exchangers of matching temperature levels countercurrently against the gaseous mixture under separation.

2. An apparatus for implementing the method as claimed in claim 1, comprising:

a unit adapted for removal of the olefins from the starting gaseous mixture and comprising heat exchangers to provide cooling the gaseous mixture under separation by stages, and separators matching same in temperature levels to provide separating the resulting gas-liquid mixture into a gaseous stream and a liquid stream at each cooling stage, and having a gas-containing section and a liquid-containing section, a unit adapted for the separation of the remaining gaseous mixture into methane-admixed hydrogen and hydrogen-admixed methane and comprising heat exchangers to provide further cooling the remaining gaseous mixture by stages, and separators matching same in temperature levels to provide separating the resulting gas-liquid mixture into a gaseous stream and a liquid stream at each cooling stage, and also a first vortex tube designed for separating the hydrogen-admixed methane into a cold stream and a hot stream of hydrogen-admixed methane and having a nozzle inlet, cold and hot ends, and a second vortex tube designed for separating the methane-admixed hydrogen into a cold stream of substantialy pure hydrogen and a hot stream of hydrogen-admixed methane and having a nozzle inlet, cold and hot ends, said heat exchangers of both units comprising tubes designed for the products resulting from the separation of the remaining gaseous mixture to be separately passed therethrough, and forming between themselves intertubular spaces designed for the passage of the gaseous mixture under separation.

said intertubular spaces of all said heat exchangers being interconncted between themselves via the gas-containing sections of said separators, the liquid-containing sections of the separators of the unit for the separation of the remaining gaseous mixture into methane-admixed hydrogen and hydrogen-admixed methane, being connected via one of said tubes of the heat exchangers of matching temperature levels to the nozzle inlet of the vortex tube designed for separating the hydrogen-admixed methane into a cold stream and a hot stream of hydrogen-admixed methane, the hot and cold ends of said vortex tube being separately connected to other said tubes of the heat exchangers of matching temperature levels, the gas-containing section of the last of the separators of the unit for the separation of the remaining gaseous mixture into methane-admixed hydrogen and hydrogen-admixed methane being connected to the nozzle inlet of the vortex tube designed for separating the methane-admixed hydrogen into a cold stream of substantially pure hydrogen and a hot stream of hydrogen-admixed methane, the cold and hot ends of said vortex tube being separately connected to other said tubes of the heat exchangers of matching temperature levels.

* * * * *